Feb. 11, 1947.  W. S. KNIGHT ET AL  2,415,746
METAL SEVERING APPARATUS
Filed Jan. 24, 1945  2 Sheets-Sheet 1

INVENTORS:
WALTER S. KNIGHT and
WALTER A. LINDSTROM,
BY John E Jackson
THEIR ATTORNEY.

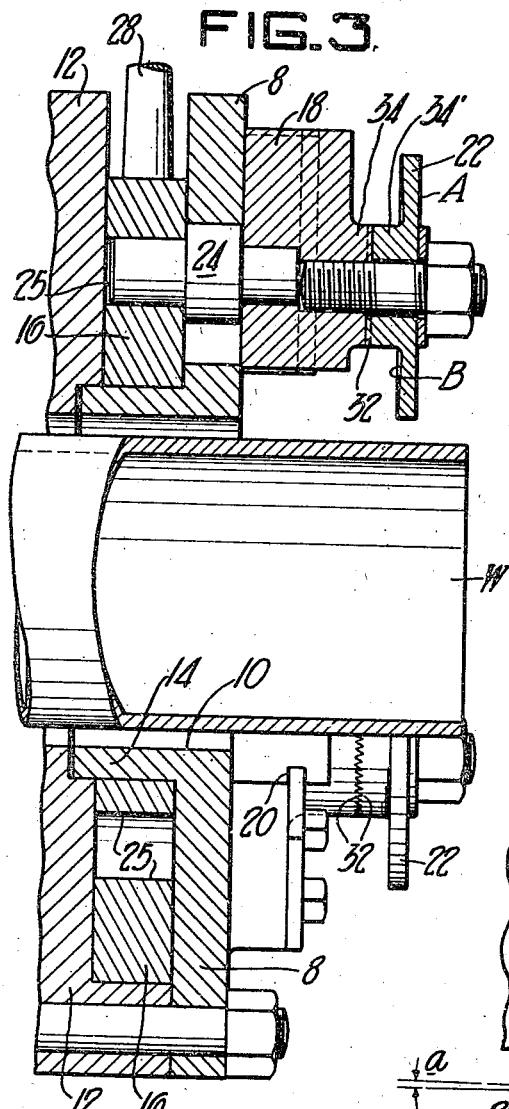
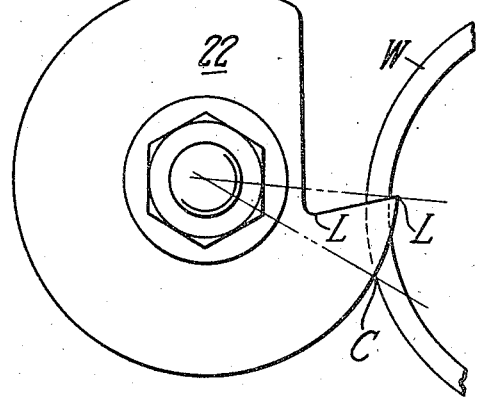
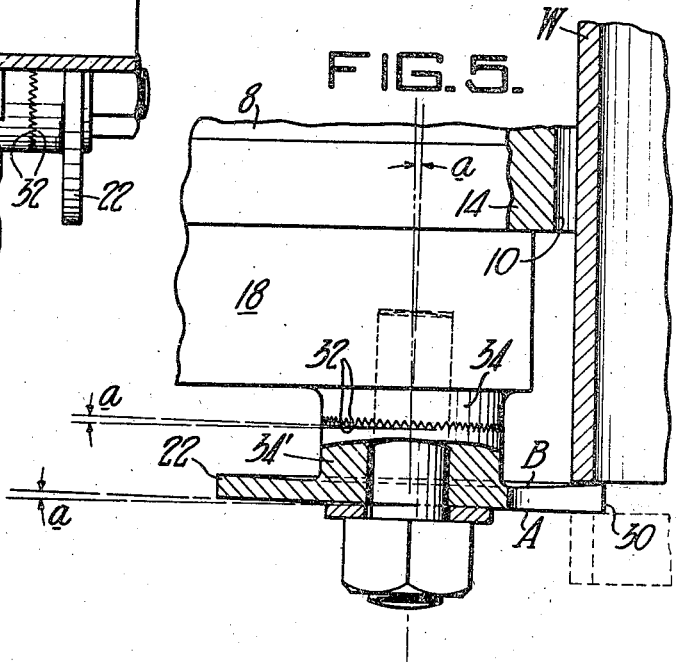

Patented Feb. 11, 1947

2,415,746

UNITED STATES PATENT OFFICE 2,415,746

METAL SEVERING APPARATUS

Walter S. Knight, Dravosburg, and Walter A. Lindstrom, Swissvale, Pa., assignors to National Tube Company, a corporation of New Jersey Application January 24, 1945, Serial No. 574,418

7 Claims. (Cl. 164—69)

This invention relates to severing or cutting off tools for metallic workpieces such as pipes, bars and the like, and to cutting-off machines, including lathes, wherein large numbers of workpieces which are to be used for ordinary commercial purposes are cut.

Conventional cutting-off tools are formed from bars of hardened tool steels which are rigidly held in heavy tool holders. It is frequently necessary to remove the tools from their holders in order to sharpen them or remove broken edges caused by uneven or crooked workpieces. Proper adjustment thereof is difficult and particularly so when a plurality of cutting tools are used in a single head so that the work is divided therebetween.

It is accordingly an object of the present invention to provide metal severing apparatus wherein the relative distance between the work and the cutting faces is not disturbed by removing the cutters for sharpening.

It is a further object of the present invention to provide metal severing apparatus that is economical to operate and rugged and simple in design.

The foregoing and further objects will be apparent from the specification and drawings wherein:

Figure 3 is a cross section along the lines III—III of Figure 2;

Figure 4 is an enlarged end view of the cutting tool of our invention showing the disposition of the cutting edge with respect to a workpiece; and Figure 5 is an enlarged plan of the cutting tool, partly in section, showing the reliefs provided therein.

Figure 1:
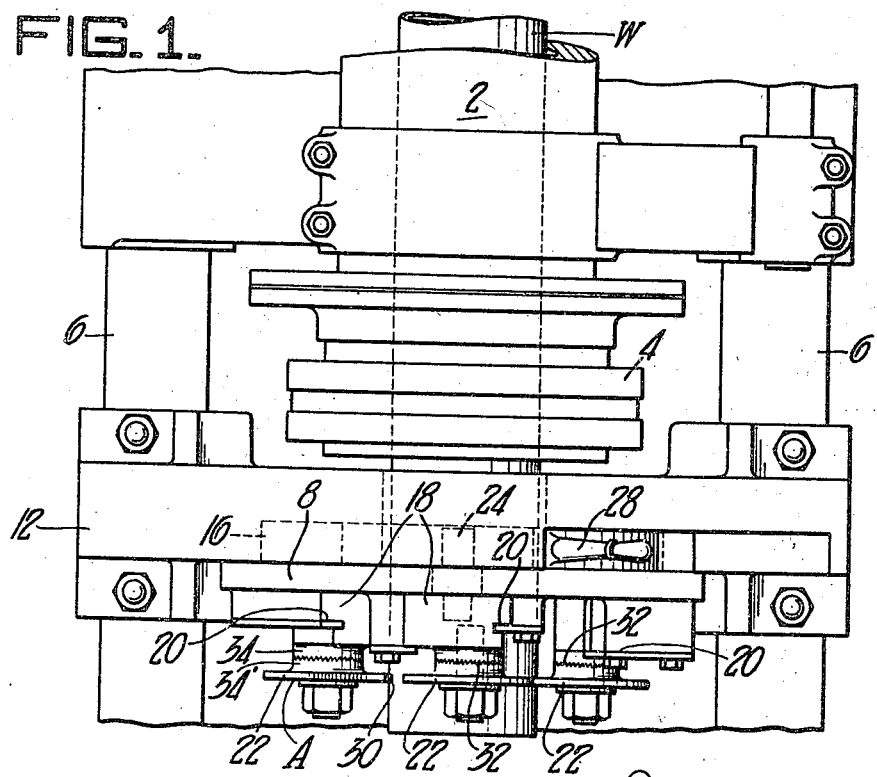
Figure 1 is a plan view.
Figure 2:
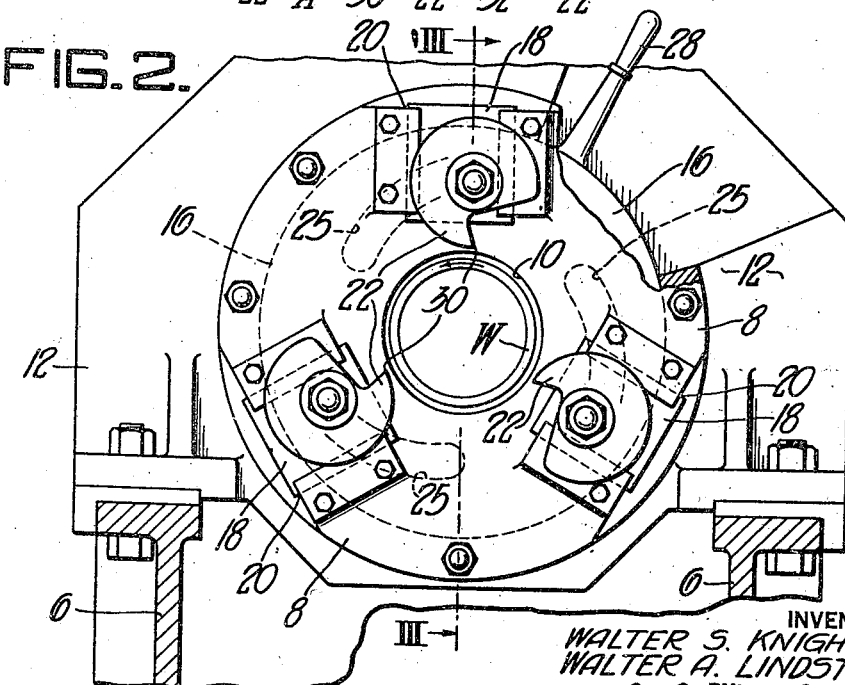
Figure 2 is an end view.

Referring more particularly to the drawings, the numeral 2 designates a conventional form of motor-driven rotatable spindle having a clutch controlled cam-operated chuck 4 adapted to grip a workpiece such as a length of pipe indicated by the letter W. Since the work-rotating spindle and chuck are of conventional form, they will not be further illustrated or described.

A longitudinally extending supporting frame 6 is mounted on and anchored to a suitable foundation. A face plate 8 having an opening 10 therethrough, is mounted on the frame by a support 12. The face plate 8 has a central rearwardly extending bearing portion 14 on which there is rotatively mounted between the face plate 8 and support 12, a cam plate 16. Slidably mounted on the face plate 8 on holders 18 in slideways 20 are three cutting tools 22.

The cutters 22 are positioned in their respective slideways 20 by pins 24 extending outwardly from both sides of the face plate 8 so that one end rigidly engages tool holders 18 and the other slidably engages slots 25 in cam plate 16. The slots 25 which are disposed rearwardly of the tool holders 18, are arcuately shaped and have a spiral-like or eccentric disposition so that one end is nearer the opening 10 than the other end. Accordingly, it is seen that a partial rotation of the cam plate 16 will cause the tool holders 18 and cutting tools 22 held thereby to move toward or away from the axis or center of the face plate 8. Cam plate 16 is provided with means for partially rotating it, such as, a handle member 28.

The cutting tools 22 are generally circular in shape and have a segment removed therefrom to form a cutting edge 30 which engages the workpiece W to remove metal therefrom when it is rotated.

It is advisable to set the center of a disc tool above the center of the workpiece and also to cut above the center of the workpiece. A line drawn through center of the tool and cutting edge of the tool should pass below the center of the workpiece. This setting provides clearance back of the cutting edge. As shown in Figure 5, tools 22 are mounted at a slight angle $a$ to the blocks 18 in a plane normal to the cutting edge 30 which provides clearance along the line L—L on the outer face A of the tools. Clearance is provided on the inner face B along the line L—L by dishing this face to make it slightly concave, as shown in Figure 5. Heel clearance at point C where the tool leaves the workpiece is provided, in addition to the concavity of face B and the angular mounting, by slightly tapering the disc from the cutting edge 30 to at least point D, which is as far as the disc can be ground back to form successive cutting edges.

Serrated meeting faces 32 are provided on the studs 34 and 34', integral with block 18 and cutters 22, respectively, to hold the cutters against rotation and at the same time make them readily adjustable. The angle $a$ is preferably provided by making the serrations on the cutter stud 34' parallel to the outer face A while the serrations on the block stud 34 are cut at the desired small angle. Due to the angular setting being provided in this manner, point L on face A maintains the same position after the cutting edge is ground back and the disc 22 rotated relative to the stud 34 and block 18 to bring the cutting edge into the plane it occupied prior to grinding.

By way of example a 4" circular cutting tool contains about 10½" of cutting edge and about 9 to 9½" of this edge or 90%, is usable before it is necessary to discard the tool. Such a tool has a minimum overhang at the cutting edge and a greater depth of beam at the critical joint of support. This is a source of strength resulting in this type of tool being less subject to breakage than conventional bar tools.

By providing edge and heel clearances or reliefs in the aforedescribed manner, the disc thickness is changed very slightly, permitting it to be ground back to form successive cutting edges until practically all of the disc has been so used. Also, one of the more important advantages of so providing clearance and relief is that when two or more of such tools are mounted in "gang" to cut in the same groove, it is not necessary to grind each disc exactly the same amount in sharpening as the thickness change is so gradual. Thus, if due to eccentricity of the workpiece the edge of one tool becomes broken, it is not necessary to grind back the others but only the one that needs re-edging. Moreover, since the point L on face A remains constant, automatic positioning or measuring devices, such as targets or stops, beyond the tool may be used and the length of the piece being cut is not affected by grinding of the disc to form new cutting edges.

As above pointed out with such tools, the holders can be adjusted with respect to each other and thereafter when the tools are removed for sharpening, it is not necessary to readjust them as the cutting edge remains a constant distance from the mounting hole in the center of the disc.

While we have shown and described one specific embodiment of our invention, it will be understood that this embodiment is merely for the purpose of illustration and description and that various other forms may be devised within the scope of our invention, as defined in the appended claims.

We claim:

1. A tool for severing metallic articles comprising a holder, a severing tool adjustably mounted on said holder, said severing tool comprising a disc having a segment removed therefrom to form a cutting edge, said tool being mounted on said holder at a slight angle thereto in a plane through said cutting edge to provide clearance for one side of said cutting edge, the opposite side of said disc being slightly concave to provide clearance for the other side of said cutting edge.

2. A tool for severing metallic articles comprising a holder, a severing tool adjustably mounted on said holder, said severing tool comprising a disc having a segment removed therefrom to form a cutting edge, said tool being mounted on said holder at a slight angle thereto in a plane through said cutting edge to provide clearance for one side of said cutting edge, the opposite side of said disc being slightly concave to provide clearance for the other side of said cutting edge, said disc being tapered to reduce the thickness thereof rearwardly from said cutting edge to provide edge clearance between said disc and work being cut thereby below said cutting edge.

3. A machine tool for severing elongated bar or pipe stock, comprising means for rotating the stock on its longitudinal axis, a tool support having an opening therethrough adapted to encompass said stock while held by said rotating means, a plurality of slide blocks slidably mounted on said support for movement radially of the longitudinal axis of said stock, severing tools adjustably mounted on said slide blocks, each of said severing tools comprising a disc having a segment removed therefrom to form a cutting edge, said disc being mounted on a slide block at a slight angle to said support in a plane through said cutting edge to provide clearance for one side of said cutting edge, the opposite side of said disc being slightly concave to provide clearance for the other side of said cutting edge, and means for moving said blocks radially of said stock.

4. A machine tool for severing elongated bar or pipe stock, comprising means for rotating the stock on its longitudinal axis, a tool support having an opening therethrough adapted to encompass said stock while held by said rotating means, a plurality of slide blocks slidably mounted on said support for movement radially of the longitudinal axis of said stock, severing tools adjustably mounted on said slide blocks, each of said severing tools comprising a disc having a segment removed therefrom to form a cutting edge, said disc being mounted on a slide block at a slight angle to said support in a plane through said cutting edge to provide clearance for one side of said cutting edge, the opposite side of said disc being slightly concave to provide clearance for the other side of said cutting edge, said disc being tapered to reduce the thickness thereof rearwardly from said cutting edge to provide heel clearance between said disc and work being cut thereby.

5. A tool for severing metallic articles comprising a holder, a disc carried by said holder, said disc having a segment removed therefrom to form a cutting edge, means for adjustably mounting said disc on said holder, said adjustable mounting means including serrated meeting faces between said holder and said disc, the meeting face on said disc being parallel to the outer face of the disc, the meeting face of the holder being angularly disposed with respect to the axis of rotation of the disc in a longitudinal plane along the axis of said disc intersecting the cutting edge, the plane of said holder serrations and the plane of said outer face intersecting along a line on the opposite side of said disc from the cutting edge whereby clearance is provided along said face, the opposite face of said tool being concave.

6. A tool for severing metallic articles comprising a holder, a disc carried by said holder, said disc having a segment removed therefrom to form a cutting edge, means for adjustably mounting said disc on said holder, said adjustable mounting means including serrated meeting faces between said holder and said disc, the meeting face on said disc being parallel to the outer face of the disc, the meeting face of the holder being angularly disposed with respect to the axis of rotation of the disc in a longitudinal plane along the axis of said disc intersecting the cutting edge, the plane of said holder serrations and the plane of said outer face intersecting along a line on the opposite side of said disc from the cutting edge whereby clearance is provided along said face, the opposite face of said tool being concave, said tool being peripherally tapered rearwardly from said cutting edge.

7. A tool for severing metallic articles comprising a substantially circular disc, said disc having a segment removed to form a cutting edge, one face of said disc being flat and normal to the axis thereof, the other face of said disc being beveled to reduce the peripheral thickness thereof rearwardly from said cutting edge, said last mentioned surface being concave whereby edge and heel clearance on both faces of said tool is obtained by mounting said tool at a slight angle to the longitudinal axis of a workpiece in a plane normal to the cutting edge.

WALTER S. KNIGHT.
WALTER A. LINDSTROM.

REFERENCES CITED

The following references are of record in the file of this patent:

UNITED STATES PATENTS

| Number | Name | Date |
|---|---|---|
| 1,632,528 | Zeidler | June 14, 1927 |
| 1,673,039 | Brown | June 12, 1928 |
| 517,004 | Grant | Mar. 20, 1894 |
| 857,284 | Huber | June 18, 1907 |
| 1,930,295 | Von Henke | Oct. 10, 1933 |
| 2,057,011 | Corwin | Oct. 13, 1936 |